(12) United States Patent
Waldo et al.

(10) Patent No.: US 8,117,443 B1
(45) Date of Patent: Feb. 14, 2012

(54) METHOD AND APPARATUS FOR GENERATING LOCATION INDEPENDENT UNIQUE IDENTIFIERS

(75) Inventors: James H. Waldo, Dracut, MA (US); Timothy Blackman, Arlington, MA (US); Robert Sproull, Newton, MA (US)

(73) Assignee: Oracle America, Inc., Redwood City, CA (US)

( * ) Notice: Subject to any disclaimer, the term of this patent is extended or adjusted under 35 U.S.C. 154(b) by 1662 days.

(21) Appl. No.: 11/243,892

(22) Filed: Oct. 5, 2005

(51) Int. Cl.
*H04L 29/06* (2006.01)
(52) U.S. Cl. ..................................................... 713/167
(58) Field of Classification Search ................... 713/167; 707/1, 10, 100
See application file for complete search history.

(56) References Cited

U.S. PATENT DOCUMENTS

| | | | |
|---|---|---|---|
| 5,740,428 A * | 4/1998 | Mortimore et al. ................... 1/1 |
| 5,914,938 A * | 6/1999 | Brady et al. ................... 370/254 |
| 5,950,207 A * | 9/1999 | Mortimore et al. ................... 1/1 |
| 6,263,330 B1 * | 7/2001 | Bessette ........................... 707/4 |
| 7,240,246 B2 * | 7/2007 | Wei .............................. 714/47.3 |
| 7,519,631 B2 * | 4/2009 | Roybal et al. ........................ 1/1 |
| 7,578,432 B2 * | 8/2009 | Libin et al. ..................... 235/375 |
| 7,761,580 B2 * | 7/2010 | Zou ............................... 709/227 |
| 7,904,488 B2 * | 3/2011 | Hood ............................. 707/803 |
| 2002/0064279 A1 * | 5/2002 | Uner ............................... 380/44 |
| 2003/0097380 A1 * | 5/2003 | Mulhern et al. .............. 707/200 |
| 2004/0002979 A1 * | 1/2004 | Seguin et al. ................... 707/10 |
| 2004/0205104 A1 * | 10/2004 | Harvey et al. ................. 709/200 |
| 2005/0144536 A1 * | 6/2005 | Wei .................................. 714/47 |
| 2006/0004822 A1 * | 1/2006 | Kim et al. ...................... 707/101 |
| 2006/0020578 A1 * | 1/2006 | Hood ................................ 707/3 |
| 2006/0074876 A1 * | 4/2006 | Kakivaya et al. ................. 707/3 |
| 2006/0168243 A1 * | 7/2006 | Zou ............................... 709/227 |
| 2007/0211892 A1 * | 9/2007 | Ohkoshi .......................... 380/30 |
| 2007/0226758 A1 * | 9/2007 | Waldo et al. .................. 719/330 |

OTHER PUBLICATIONS

Sun Microsystems, Inc. "Stream Unique Identifiers". Java Object Serialization Specification. 1999. Available at http://web.archive.org/web/20000824010049/java.sun.com/j2se/1.3/docs/guide/serialization/spec/class.doc6.html. Downloaded Jun. 11, 2009.*
Unique Local IPv6 Unicast Addresses, R. Hinden, B. Haberman. Internet-Draft, draft-ietf-ipv6-unique-local-addr-06.txt, Sep. 24, 2004.*
Leach, P. J. and Salz, R., UUIDS and GUIDS, Internet-Draft, Feb. 4, 1998, pp. 1-29, http://www.ics.uci.edu/~ejw/authoring/uuid-guid/draft-leach-uuids-guids-01.txt.
Paskin, N., The DOI® Handbook, Edition 4.2.0, International DOI Foundation, Inc., Oxford, UK, Feb. 2005, http://www.doi.org.

* cited by examiner

*Primary Examiner* — David Garcia Cervetti
(74) *Attorney, Agent, or Firm* — Brooks Kushman P.C.

(57) ABSTRACT

Universal Unique Identifiers (UUIDs) are generated using a variety of algorithms and these algorithms are themselves encoded into the UUID. Each UUID includes two parts: a first part that is an identifier, which is unique to the second part. The second part identifies the algorithm that was used to generate the identifier. Thus, the uniqueness of the identifier is based on how the identifier was created not the entity that created it. The identity of two UUIDs is determined by comparing both the generator algorithm ID and the relative ID.

13 Claims, 6 Drawing Sheets

METHOD AND APPARATUS FOR GENERATING LOCATION INDEPENDENT UNIQUE IDENTIFIERS

BACKGROUND

During the lifetime of objects, references to the objects should allow the objects to be accessed. However, conventional references (or proxy objects) such as those found in remote object invocation methods such as the Java™ Remote Method Invocation (RMI) or Jini™ Extended Remote Invocation (Jini™ ERI) systems include a reference to a particular machine—either the machine on which the object itself is running, or the machine on which an activation daemon that can start the object is running. If the object is moved from that machine, either to balance loads or because the machine is retired, these references to the object will cease to be able to find the object.

A conventional solution to this problem involves the assignment of Universally Unique Identifiers, or UUIDs, to all objects. In general, a UUID is a pure name; there is no additional information encoded in the UUID itself. In this way a UUID is different from other identifiers like a URL (which encodes a host name where the object to which it refers is located) or a filename. UUIDs are also meant to be used by programs rather than people, so there is no need to make them semantically meaningful.

These UUIDs can be used, in conjunction with other parts of the system, to find proxy objects for remotely accessible mobile objects that have been moved from the location at which they were last contacted. UUIDs also allow references to objects to be compared for equality based on the objects to which they refer, which is often the semantics that are desired for such references. However, in order to determine the equality of references by comparing their UUIDs and in order to locate mobile objects by their UUIDs there must be a guarantee that no two distinct objects within the system are ever assigned the same UUID.

However, the generation of unique identifiers for distinct objects is a difficult design problem. Uniqueness of such identifiers can best be guaranteed by using a central authority to generate or control the generation of the identifiers, but the presence of such an authority limits scalability. Non-centralized schemes are more scalable, but are all open to the possibility that two distinct objects could be given the same identifier which is, therefore, no longer unique. This difficulty is further exacerbated when identifiers are used to identify long-lived distributed objects that may move from one location to another during their lifetime and may outlive the equipment on which they were created. For example, UUIDs may be assigned by entities, such as hospitals and doctor offices to entities, such as patients. In this case, the assigning entities will often have existing patient identifiers that they will want to use as UUIDs, or as part of a UUID. In systems that deal with such UUIDs it is critical that the UUID be unique because if two separate entities are assigned the same UUID, they will not be seen as distinct from the point of view of the system. This is much like the cases, heard about occasionally, when two people are issued the same social security number. From the point of view of the Social Security administration, there is only one person.

There are a number of existing schemes for generating UUIDs. One of the best known was originally part of the Network Computing System, and combines a MAC address of the machine generating the UUID with the time of generation and some random bits to generate a 128-bit number. This scheme has been formalized as an IETF draft specification, which can be found at the Internet site: hegel.ittc.ku.edu/topics/internet/internet-drafts/draft-l/draft-leach-uuids-guids-01.txt, that extends the scheme by allowing UUIDs to be generated using a secure random number generator. The advantage of this scheme for UUID generation is that the mechanism is totally decentralized, requiring no appeal to a central authority or registration of the resulting UUIDs. There are a couple of problems with this generation scheme, however. First, the version that uses the MAC address as a way of insuring unique namespaces within each machine assumes that the MAC address of a machine will not be changed, an assumption that may not be true. Second, with either version, UUIDs can only be probabilistically guaranteed to be unique; there is always a possibility (although it may be very small) that the same UUID will be assigned to two different entities.

A different sort of mechanism is used for generating UUIDs for such things as RFID tags and for Digital Object Identifiers and is described on Internet website www.doi.org/hb.html. With these mechanisms, parts of a namespace (essentially, the prefix to a UUID) are handed out by a central authority to assigners of UUIDs. It is then the responsibility of those assigners to hand out unique identifiers within that namespace. Unless an assigner has been given a part of this namespace, the assigner is not supposed to generate any of the UUIDs, as any UUIDs such an assigner might generate might conflict with other UUIDs produced by another assigner. While this approach requires a central authority, it also insures that the UUIDs generated are in fact unique (or at least that those actually generating the UUIDs can insure that they are unique). However, since a central authority is involved, these mechanisms are subject to scalability problems.

SUMMARY

In accordance with the principles of the invention, UUIDs are generated using a variety of algorithms and these algorithms are themselves encoded into the UUID. Each UUID includes two parts: a first part that is an identifier, which is unique to the second part. The second part identifies the algorithm that was used to generate the identifier. Thus, the uniqueness of the identifier is based on how the identifier was created not the entity that created it.

In one embodiment, the generation algorithm encoding is used as part of an equivalence mechanism used to compare two UUIDs.

In another embodiment, an interface is defined for each type of UUID. The interface allows variable-length implementations of the UUID, and the ability to identify the algorithm used to generate the UUID.

DETAILED DESCRIPTION

Figure 1:
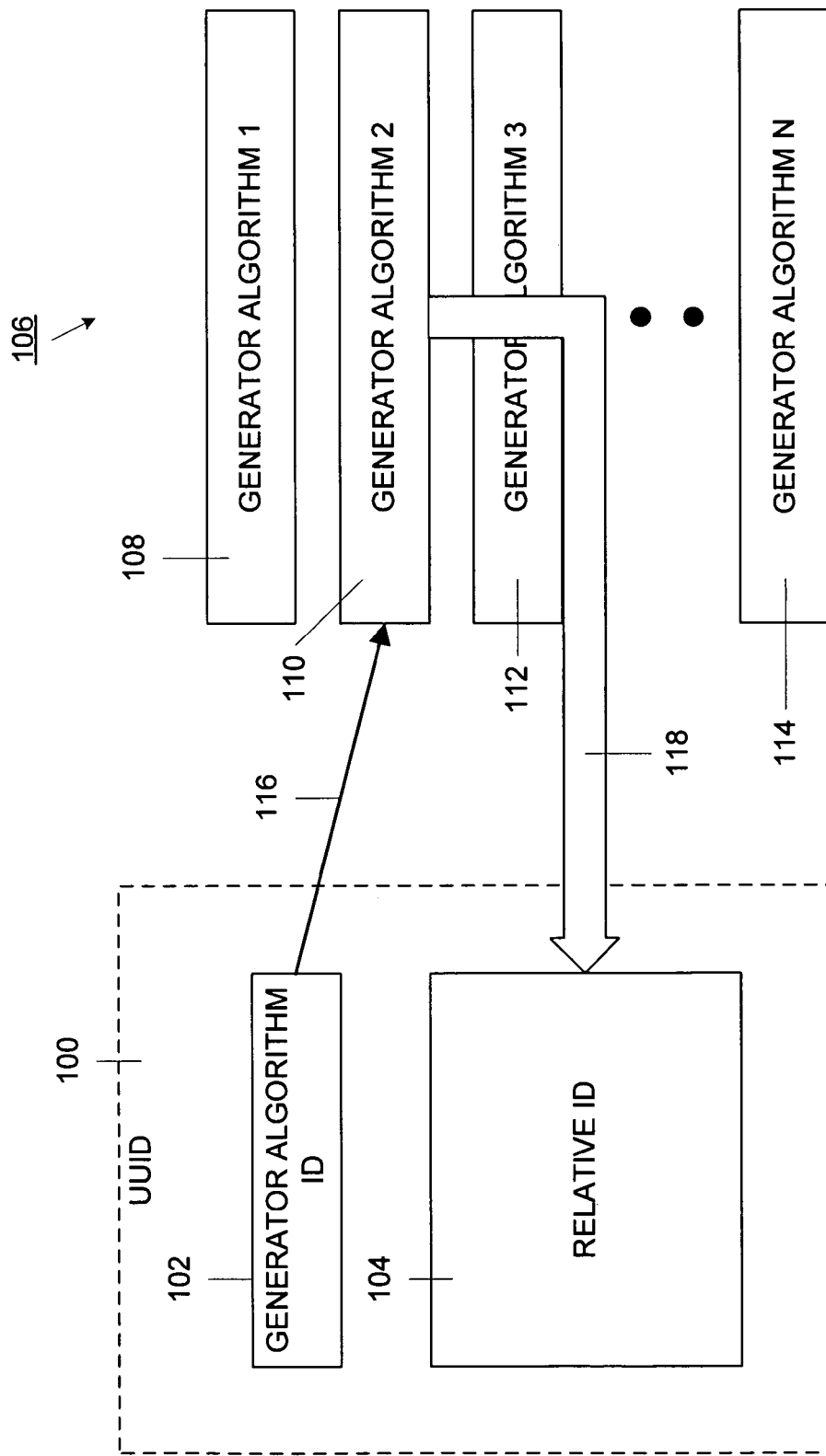
FIG. 1 is a block schematic diagram of the inventive UUID illustrating the manner of generating the UUID.

The basic structure of a UUID 100 constructed in accordance with the principles of the invention is shown in FIG. 1. In particular, the UUID consists of a generator algorithm ID 102 and a relative ID 104. The relative ID 104 is generated by one of a set of generator algorithms 106 of which generator algorithms 108-114 are shown. As illustrated in FIG. 1, relative ID 104 is generated by generator algorithm 2 (110) as schematically illustrated by arrow 118. The generator algorithm that generated the relative ID for a UUID is identified in the UUID by a generator algorithm ID. For example, generator algorithm 110 that generated relative ID 104 is identified in UUID 100 by generator algorithm ID 102.

Figure 2A:
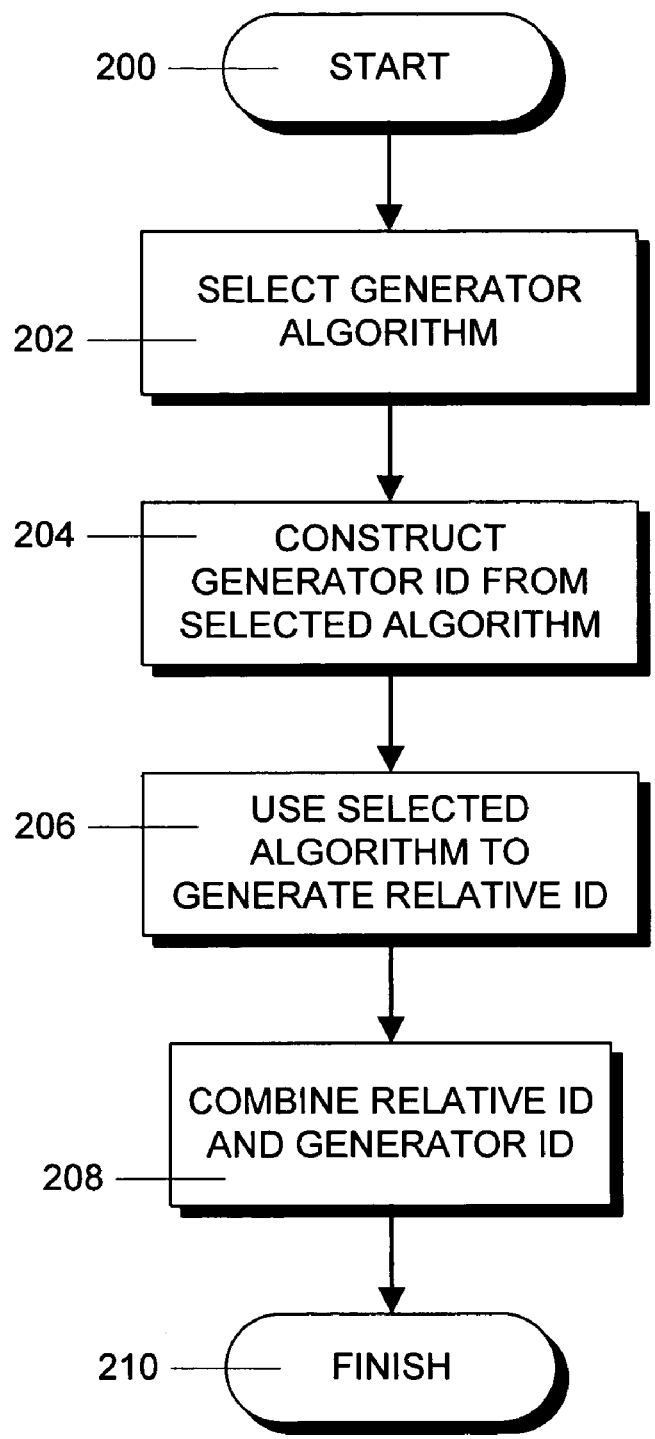
FIG. 2A is a flowchart that shows the steps in an illustrative process for generating a UUID having both a generator algorithm ID and a relative ID in accordance with the principles of the invention.
Figure 2B:
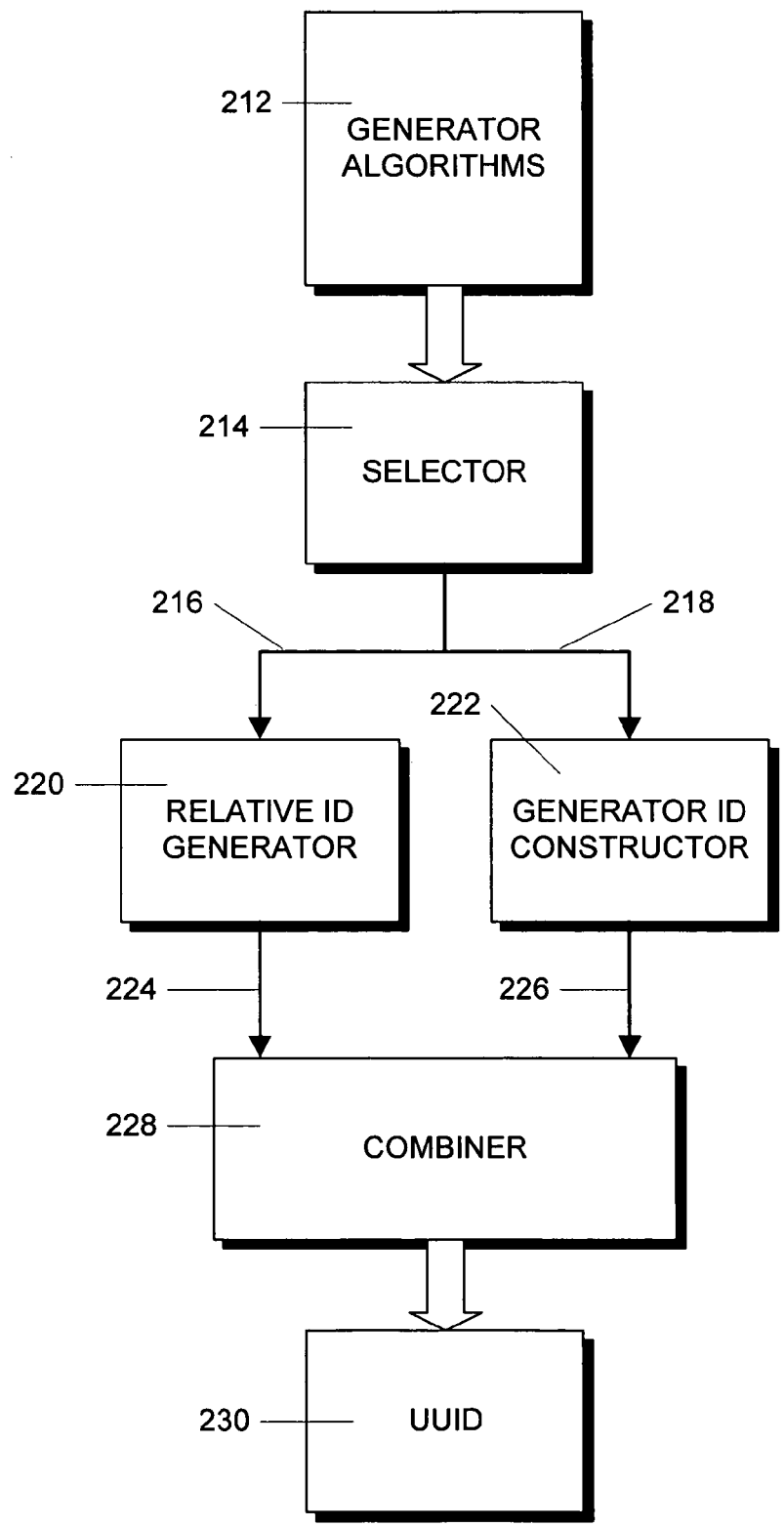
FIG. 2B is a block schematic diagram illustrating an apparatus for generating a UUID using the process as set forth in FIG. 2A.
Figure 3:
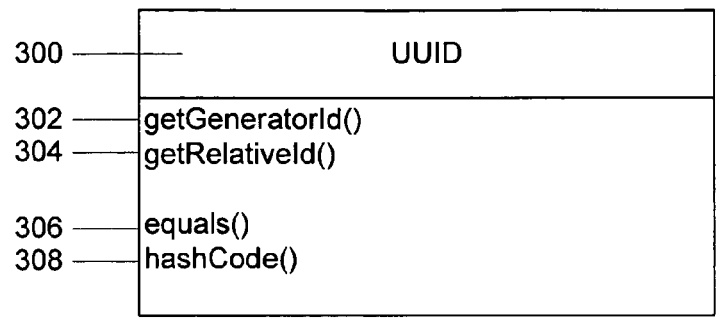
FIG. 3 is a representation of an illustrative interface that might be used to generate the inventive UUID.

The process of generating a new UUID is illustrated in the flowchart in FIG. 2A and an illustrative apparatus for generating the UUID is shown in FIG. 2B. This process begins with step 200 and proceeds to step 202 where a generator algorithm for the UUID is selected from a set of generator algorithms 212 by means of a selector 214. The selector 214 might be a computer, but could also be administrative personnel who are constructing a system that uses the UUID. The selected algorithm is provided, as indicated schematically by arrows 216 and 218, to a relative ID generator 220 and a generator ID constructor 222. In step 204, an ID for the generator algorithm is constructed by the generator ID constructor 222, if necessary. Next, in step 206, the selected generator algorithm is used by the relative ID generator 220 to generate the relative ID 104. The generated relative ID is provided to a combiner 228 as indicated by arrow 224 and the generator algorithm ID is also provided, as indicated by arrow 226, to combiner 228. In step 208, the combiner combines the two IDs to generate the UUID 230 and the process finishes in step 210.

In one embodiment of the invention, an interface 300 defines UUIDs. An example of such an interface is:

```
public interface Uuid extends Serializable {
public long getGeneratorId( );
public byte[ ] getRelativeId( );
}
```

This interface defines a UUID as a two-part entity, one part of which is an array of bytes that can be obtained by calling the getRelativeId( ) method 304. The size of this array will be determined by the implementation of this interface, allowing the size to differ from one implementation to another. The byte array constitutes a unique identifier relative to the generator algorithm ID of the UUID, but may not be globally unique.

As illustrated above, along with the byte array, the UUID will include an identifier for the generator algorithm that was used to generate this byte array. The generator algorithm ID may be obtained from the UUID by calling the getGeneratorId( ) method 302. In the particular interface shown, this generator algorithm identifier is a long integer or a 64-bit number, although other length identifiers could also be used as would be known by those skilled in the art. It is the responsibility of the generator algorithm to insure that each byte array that it generates is unique for that algorithm. The generator algorithm identifier will insure uniqueness between different generator algorithms for generating the byte array. Thus, in this interface, the generator algorithm identifier is used as a way of partitioning the namespace of relative identifiers. However, this partitioning is done based on how the relative identifier is created, not on the entity that is creating the relative ID.

This interface allows, for example, an implementation that uses conventional algorithms for generating relative IDs. Several generator algorithms that are suitable for use with the invention are described in IETF draft RFC 1422 available at website: ietf.org/rfc/rfc1422.txt. These algorithms generate 128 bit UUIDs that can be used as relative IDs and are represented in the above interface as a 16-element byte array. Alternatively, other methods could be used to generate the relative ID. For example, a particular patient numbering scheme used by a hospital could be used (so that the relative identifier would be a size that was required to accommodate that scheme). Relative IDs of two different kinds will never evaluate as being equal (even if they refer to the same entity in the real world) because, as described below, part of the equality evaluation takes into account the algorithm that was used to generate the relative ID, which algorithm will be different for these two kinds.

Since the relative ID may only be unique relative to the generator algorithm and, thus, the generator algorithm identifier, the uniqueness of the UUID can be assured only if the uniqueness of the generator algorithm identifier can be assured. The inventive UUID scheme provides several ways of achieving this assurance, depending on the strength of assurance that is required. For example, in another embodiment, assuming that the generator algorithm identifier is defined to be a 64 bit number as discussed above, a section, such as the first two bits, of the generator algorithm identifier can be used to identify particular mechanisms for insuring that the generator algorithm identifier is itself unique. Illustratively, the first two bits can be assigned some value, such as "00", to indicate that the generator algorithm identifier is a registered ID, that is, its uniqueness is guaranteed by some outside authority. With this arrangement, when an organization, or individual, decides on a new algorithm for generating relative IDs, that algorithm can be registered with the central authority, and, as a result of the registration, the algorithm will be assigned a unique generator algorithm ID.

Figure 4:
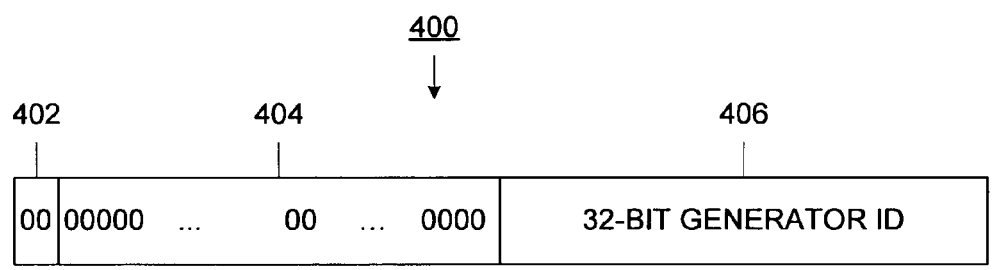
FIG. 4 is an example of a generator ID according to one embodiment in which the generator ID is determined by a third-party authority.
Figure 5:
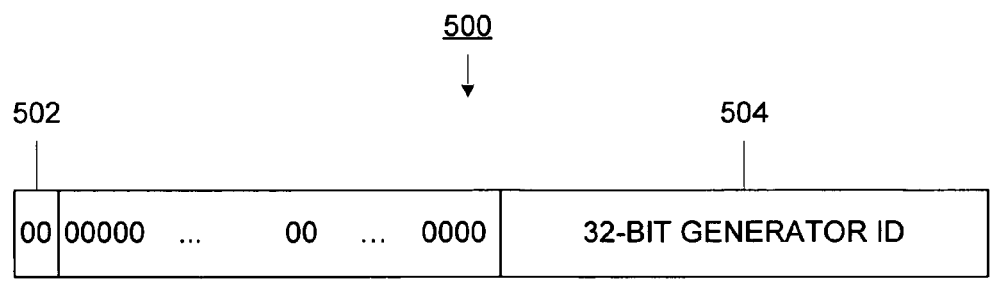
FIG. 5 is an example of a generator ID according to another embodiment in which the generator ID is a hash code of a fully-qualified class name of the algorithm that is used to generate the relative ID.

Such a generator algorithm ID may have various forms. As shown in FIG. 4, in another embodiment using the aforementioned 64-bit number as a generator algorithm ID 400, the first two bits 402 may be set to "00". The remainder of the first 32 bits of the identifier 404 may also be set to the value of "0", with the last 32 bits 406 having a unique value that can be used to distinguish this algorithm from any other algorithm that has been previously registered. Requiring the first 32 bits of the generator algorithm ID to be "0" in this case provides flexibility for adding other schemes that assure generator algorithm ID uniqueness in the future. Since the generator algorithm ID identifies the algorithm used to generate the relative ID rather than the organization that generates the UUID, two organizations that generate UUIDs using the same registered algorithm will share the same generator algorithm ID, However, not all generator algorithms will be registered, either because the user of the algorithm does not realize such a registration is needed or because the algorithm is considered to be proprietary or otherwise secret. For algorithms that are not registered with a central authority, the first section of the identifier will have a value different from that in the generator algorithm identifier used with registered algorithms. For example, the first two bits of the aforementioned 64-bit generator algorithm identifier will have a value different from "00", such as "11," in order to distinguish this type of generator algorithm from a registered algorithm. Illustratively, a generator algorithm identifier 500 in accordance with another embodiment is shown in FIG. 5. The first two bits 502 are given the value "11." The next 62 bits 504 are a secure hash of a fully-qualified class name of the generator algorithm. This hash code would be generated by calling the hashCode( ) method 308 of the UUID interface 300 and passing in the generator algorithm name.

Depending on the programming language used to write the generator algorithm, this name will be more or less unique. For example, assuming that the generation algorithm is written in Java™ programming language, the name will be unique if the Java conventions for class and package naming are followed. For those algorithms that are not written in the Java™ language, the name of the generator algorithm, properly scoped by some form of reverse domain name system naming, could also suffice. Note that while using this hash code will produce a very high probability of a unique generator algorithm ID, the uniqueness cannot absolutely guaranteed. The possibility that two independent generator algorithms will be given exactly the same fully qualified class name cannot be eliminated, nor can the possibility of hash collisions on different class names. However, given that 62 bits are used for this name, these possibilities are exceptionally remote; for the likelihood of any two values being the same to reach 50% there would need to be at least $2^{31}$ algorithms in use, which seems highly unlikely.

It is important that classes that implement the UUID interface 300 provide an override of the equals( ) method 306 in the interface 300 (and, because of that, the hashCode( ) method must also be overridden). The implementation of the equals( ) method 306 must evaluate two UUID objects as being equal only if they have the same generator algorithm ID and the same relative ID. The operation of the equals( ) method 306 is shown schematically in FIG. 6 in which two UUIDs 600 and 602 are compared.

In particular, when implementing the equals( ) method 306, it is important that both generator IDs 604 and 606 and the parts of the relative IDs 614 and 616 be compared for identity, since it is possible (though unlikely) that two different UUID generator algorithms could produce the same UUID. Thus, the uniqueness of the UUIDs can only be assured if they are also identical in their generator IDs. Note that there are naïve relative ID generation mechanisms (such as assigning small integers in some sequence) that could easily produce relative IDs that are identical to those produced by other, equally naïve, generation mechanisms. This could easily be true if the generation mechanism used identifiers that have been used for other purposes (such as identifying patients within a particular practice).

Figure 6:
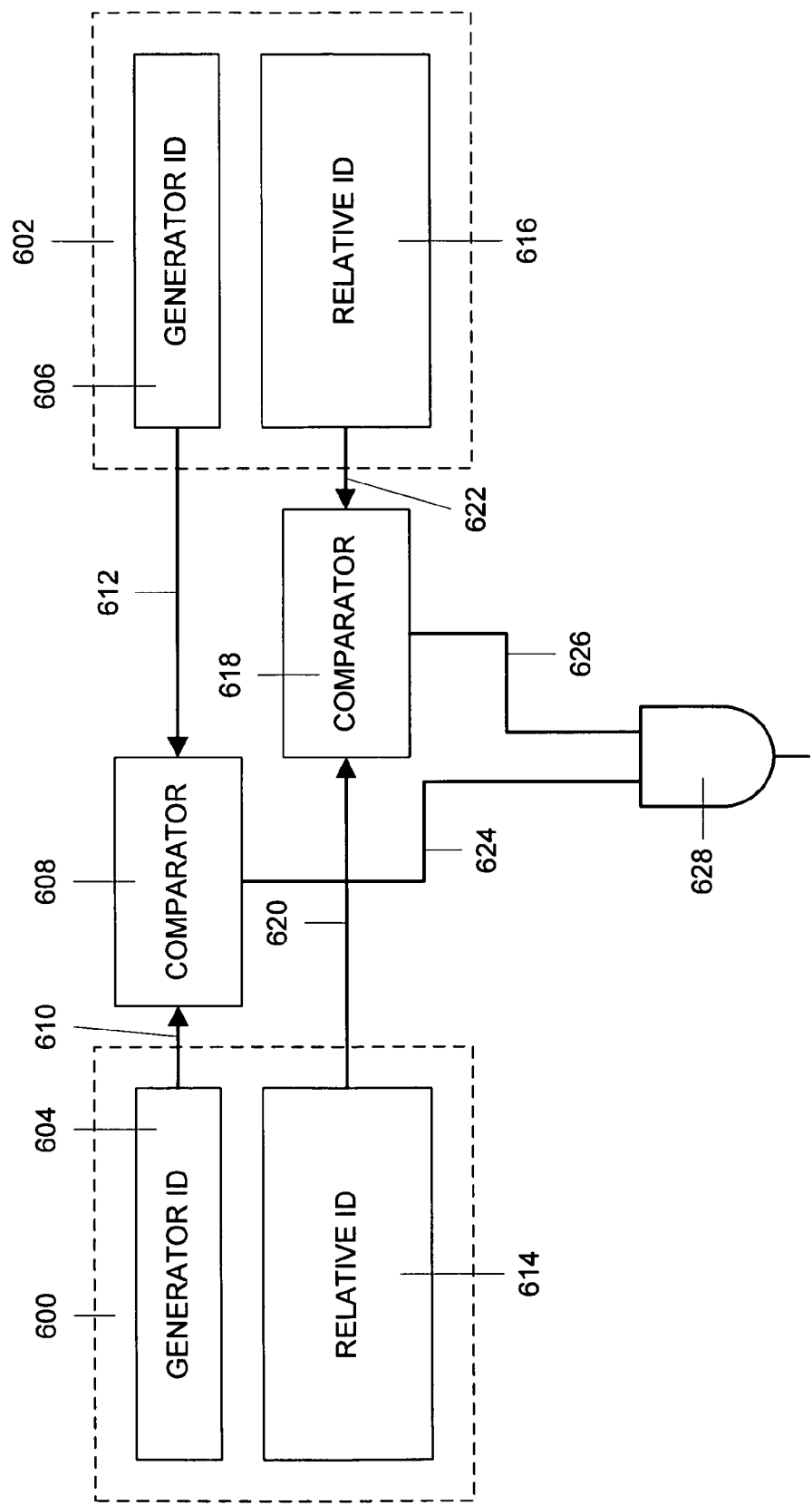
FIG. 6 is a block schematic diagram illustrating a comparison of two UUIDs to determine if they are the same.

Thus, as shown in FIG. 6, UUIDs 600 and 602 are compared by separately comparing generator IDs 604 and 606 (indicated by providing generator IDs 604 and 606 to a comparator 608 as indicated by arrows 610 and 612) and also separately comparing relative IDs 614 and 616 (indicated by providing relative IDs 614 and 616 to a separate comparator 618 as indicated by arrows 620 and 622). The results of these comparisons must both be positive (as indicated by providing the outputs 624 and 626 of comparators 608 and 618, respectively, to AND gate 628).

As an example, one implementation uses a relative ID generator algorithm in a net.jini.id package which can be found at website jini.org/downloads. This generator algorithm is written in the Java™ language and generates a 128 bit value that is presented as a pair of 64 bit "long" values. The generation algorithm uses a secure random number generator to create the ID. The pair of 64-bit values is converted into an array of bytes by the constructor for the UUID class as described above. If the generator algorithm will be an algorithm that will be registered, the generator algorithm ID will be a 64 bit value, the first 32 bits are zero and the last 32 bits have a numeric generator algorithm ID, such as "1". Alternatively, if the generator algorithm will not be register, then the value of the generator algorithm ID for that implementation would be a 62-bit SHA-1 secure hash of the string "com.sun.Neuromancer.ref.UuidImpl", prefixed with "11".

Figure 7:
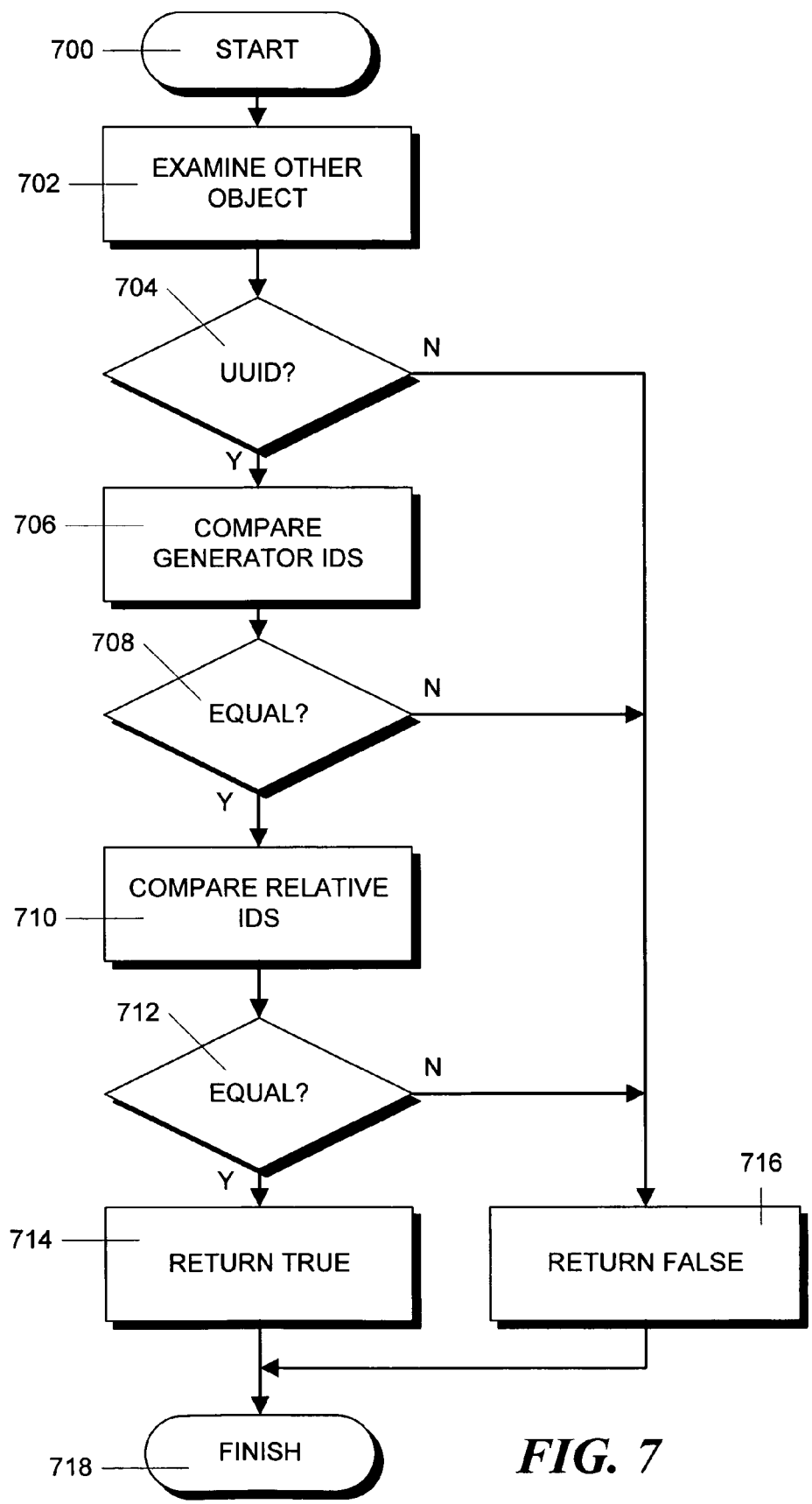
FIG. 7 is a flowchart showing the steps in an illustrative process for comparing a UUID with another object.

FIG. 7 illustrates the steps involved in comparing a UUID for equality with any other object. This process starts in step 700 and proceeds to step 702 where the other object is examined to determine whether it is a UUID. If it is, then the process proceeds to step 706 where the generator algorithm IDs are checked for equality. If these are equal as determined in step 708, then the relative IDs are compared individually for equality. Only if is determined in step 712 that the relative IDs are equal is a value of "TRUE" returned in step 714. A negative determination in any of steps 704, 708 or 712 causes a value of "FALSE" to be returned in step 716. The process then finishes in step 718.

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium either can be a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different relative ID configurations could be used, such as text strings. In addition, different algorithms may be used to generate the generator algorithm ID. Further, different hash algorithms can be used to hash the generator algorithm name other than those shown. The order of the process steps may also be changed without affecting the operation of the invention. Other aspects, such as the specific process flow, as well as other modifications to the inventive concept are intended to be covered by the appended claims.

What is claimed is:

1. A method for use in a computer having a processor and a memory that generates location independent unique identifiers in the memory and comprises:
   (a) controlling the processor with a generator algorithm to generate a relative identifier that is unique relative to that algorithm;
   (b) generating a generator algorithm identifier that probabilistically uniquely identifies the generator algorithm that is used in step (a), wherein when the generator algorithm is an unregistered generator algorithm, generating the generator algorithm identifier includes hashing a class name of the generator algorithm and using the resulting hash as the generator algorithm identifier; and
   (c) controlling the processor to form a probabilistically unique identifier in the memory from the relative identifier and the generator algorithm identifier;
   wherein step (a) comprises selecting as the generator algorithm, an algorithm that is used in a medical system to identify patients.

2. The method of claim 1 wherein step (a) comprises selecting the generator algorithm from a set of pre-defined generator algorithms.

3. The method of claim 1 wherein the generator algorithm generates an array of bytes in the memory.

4. The method of claim 1 wherein step (b) comprises registering the generator algorithm with a central authority and using the central authority to generate the generator algorithm identifier.

5. The method of claim 1 wherein step (c) comprises constructing in the memory an object that includes the generator algorithm identifier and the relative identifier.

6. The method of claim 5 wherein step (c) further comprises using an interface to define the object.

7. The method of claim 1 further comprising:
   (d) generating two unique identifiers in the memory; and
   (e) determining the identity of the two unique identifiers by comparing the generator algorithm identifiers in each of the two unique identifiers and comparing the relative identifiers in the two unique identifiers.

8. A tangible non-transitory computer-usable medium for storing data for access by a program executing on a data processing system, comprising a data structure that acts as a UUID including:
   a relative identifier that is generated by a generator algorithm and is unique relative to that generator algorithm; and
   a generator algorithm identifier that probabilistically uniquely identifies the generator algorithm, wherein when the generator algorithm is an unregistered generator algorithm, the generator algorithm identifier includes a resulting hash from hashing a class name of the generator algorithm.

9. The tangible computer-usable medium of claim 8 wherein the relative identifier comprises an array of bytes.

10. The tangible computer-usable medium of claim 8 wherein the generator algorithm is registered with a central authority and the central authority generates the generator algorithm identifier.

11. The tangible computer-usable medium of claim 8 wherein the data structure is an object that includes the generator algorithm identifier and the relative identifier.

12. The tangible computer-usable medium of claim 11 wherein the object is defined by an interface.

13. A computer program product for use in a computer having a processor and a memory that generates location independent unique identifiers in the memory and comprises a computer usable non-transitory tangible medium having computer readable program code fixed thereon, including:
   generator algorithm code that generates a relative identifier that is unique relative to that algorithm;
   program code for providing a generator algorithm identifier that probabilistically uniquely identifies the generator algorithm used by the generator algorithm code, wherein when the generator algorithm is an unregistered generator algorithm, providing the generator algorithm identifier includes hashing a class name of the generator algorithm and using the resulting hash as the generator algorithm identifier; and
   program code for forming a probabilistically unique identifier in the memory from the relative identifier and the generator algorithm identifier.

* * * * *

UNITED STATES PATENT AND TRADEMARK OFFICE
CERTIFICATE OF CORRECTION

| | | |
|---|---|---|
| PATENT NO. | : 8,117,443 B1 | Page 1 of 1 |
| APPLICATION NO. | : 11/243892 | |
| DATED | : February 14, 2012 | |
| INVENTOR(S) | : James H. Waldo et al. | |

It is certified that error appears in the above-identified patent and that said Letters Patent is hereby corrected as shown below:

Column 8, Line 13 of Claim 8:

Replace "generator algorithm."

With -- generator algorithm;
wherein the generator algorithm is an algorithm that is used in a system to identify items. --

Column 8, Line 18 of Claim 13:

Replace "generator algorithm identifier"

With -- generator algorithm identifier;
wherein the generator algorithm is an algorithm that is used in a system to identify items. --

Signed and Sealed this
Fourteenth Day of August, 2012

David J. Kappos
*Director of the United States Patent and Trademark Office*